United States Patent
Kumar et al.

(10) Patent No.: US 10,977,654 B2
(45) Date of Patent: Apr. 13, 2021

(54) MACHINE LEARNING ENGINE FOR FRAUD DETECTION DURING CROSS-LOCATION ONLINE TRANSACTION PROCESSING

(71) Applicant: PAYPAL, INC., San Jose, CA (US)

(72) Inventors: Dinesh Kumar, Santa Clara, CA (US); Geethamanjusha Melanathurbhaskar, Tamil Nadu (IN)

(73) Assignee: PAYPAL, INC., San Jose, CA (US)

( * ) Notice: Subject to any disclaimer, the term of this patent is extended or adjusted under 35 U.S.C. 154(b) by 190 days.

(21) Appl. No.: 16/024,382

(22) Filed: Jun. 29, 2018

(65) Prior Publication Data

US 2020/0005310 A1    Jan. 2, 2020

(51) Int. Cl.
*G06Q 40/00* (2012.01)
*G06Q 20/40* (2012.01)
*G06K 9/62* (2006.01)
*G06N 20/00* (2019.01)

(52) U.S. Cl.
CPC ....... *G06Q 20/4016* (2013.01); *G06K 9/6223* (2013.01); *G06N 20/00* (2019.01); *G06Q 20/405* (2013.01); *G06Q 40/00* (2013.01)

(58) Field of Classification Search
CPC .... G06Q 40/00; G06Q 20/405; G06K 9/6223; G06N 20/00
See application file for complete search history.

(56) References Cited

U.S. PATENT DOCUMENTS

| | | | |
|---|---|---|---|
| 7,089,208 B1* | 8/2006 | Levchin | G06Q 20/02 705/39 |
| 2008/0109392 A1* | 5/2008 | Nandy | G06Q 20/10 706/47 |

OTHER PUBLICATIONS

Grażyna Suchacka and Grzegorz Chodak, Using association rules to assess purchase probability in online stores, Sep. 6, 2016, Spring Nature, web, 1-5 (Year: 2016).*

* cited by examiner

*Primary Examiner* — I Jung Liu
(74) *Attorney, Agent, or Firm* — Haynes and Boone, LLP

(57) ABSTRACT

A machine learning engine for fraud detection related to cross-location online transaction processing may be trained using artificial intelligence techniques and used according to techniques discussed herein. An account may be used to electronically process a transaction for an item in a foreign location, such as a new city or country. The transaction may be identified as potentially fraudulent based on the item and/or location of purchase. A service provider may identify a vertical, such as an item type, for the transaction, and may determine the account's propensity to purchase within that vertical in the new location and the merchant's propensity to sell within that vertical to the account's location or shipping address. Based on the propensities, the service provider may utilize one or more risk rules with a risk assessment engine to determine transaction processing risk and whether to proceed with transaction processing.

16 Claims, 7 Drawing Sheets

US 10,977,654 B2

MACHINE LEARNING ENGINE FOR FRAUD DETECTION DURING CROSS-LOCATION ONLINE TRANSACTION PROCESSING

TECHNICAL FIELD

The present application generally relates to machine learning and artificial intelligence, and more specifically to using machine learning and artificial intelligence for fraud assessment and risk detection during electronic transaction processing.

BACKGROUND

Various types of service providers may provide electronic transaction processing services to different entities. These service providers may provide online accounts to users for use in processing transactions electronically. In order to secure accounts, users may establish authentication credentials (e.g., a username, password, etc.) used to authenticate user identity and authorize account use. However, misappropriation of authentication credentials and other fraud may introduce the risk of unauthorized transactions.

Figure 1:
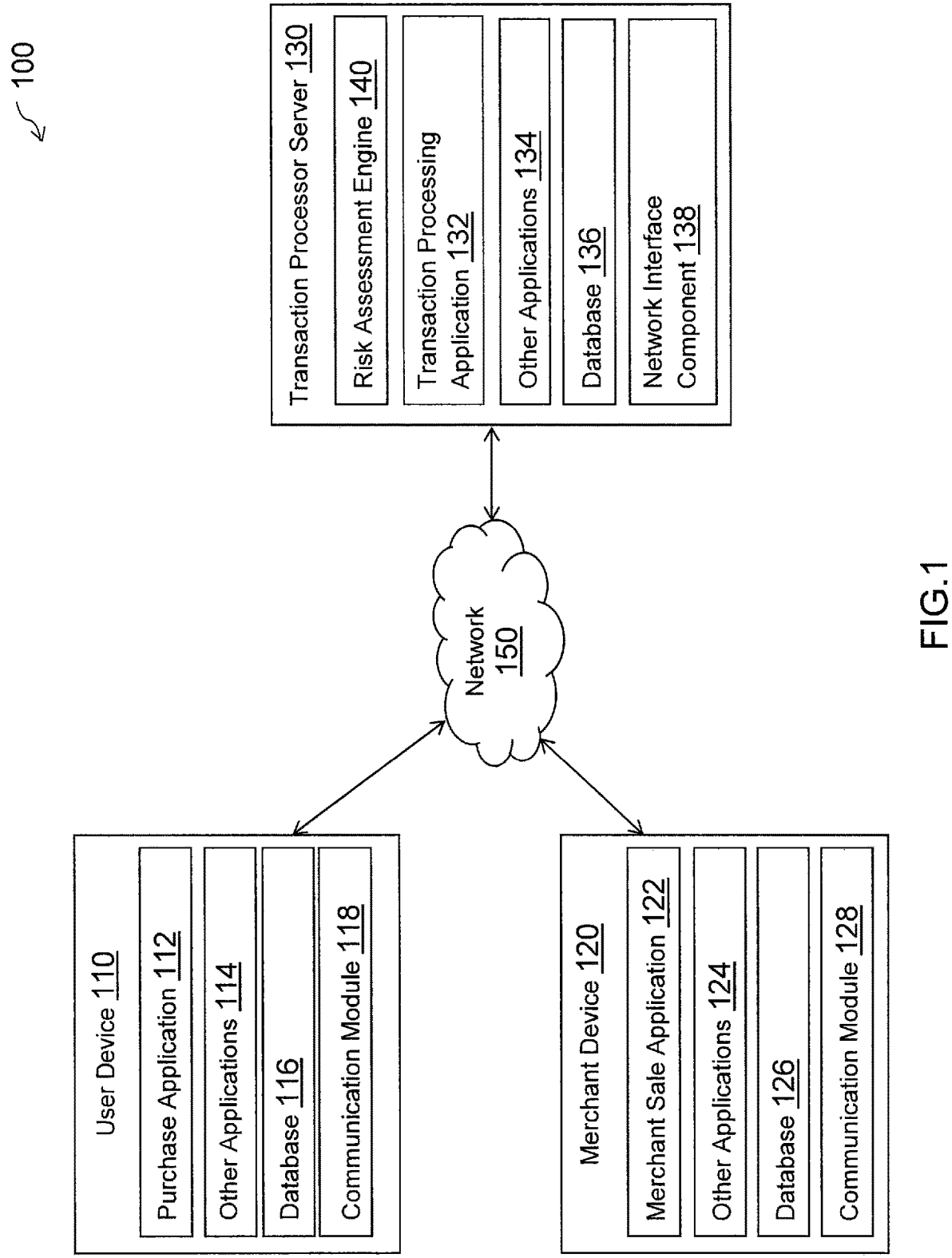
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a machine learning engine for fraud detection during cross-location online transaction processing, according to various embodiments. Systems suitable for practicing methods of the present disclosure are also provided.

Service providers may provide electronic transaction processing for online transactions where the buyer may be located in a different location from a seller, such as a different city, county, state, country, or other geographically different location. Due to the anonymous nature of online transaction processing where in-person identification and authentication cannot be performed, transaction processing over a network and between disparate locations may introduce risk and fraud to the service provider and users having accounts for electronic transaction processing with the service provider. For example, a user's account may become compromised (e.g., authentication credentials may be revealed by the user or stolen, or another user may otherwise perform an account takeover action to utilize the account), and an unauthorized user may utilize the account to fraudulently purchase items in transactions electronically. Since a malicious user is often likely to process transactions in other locations than where the account's primary or establishing user normally processes transactions (e.g., by purchasing from other merchants in different locations and/or requesting shipping/payment to unknown or different locations), a service provider may identify the transaction as potentially fraudulent for electronic processing if the service provider determines that the cross-location transaction is being made or requested from a merchant and/or shipping by the merchant to a foreign location that is not previously (or uncommonly used) by the user during transaction processing for the transaction in a particular vertical or other grouping defined by a common characteristic.

In order to assess risk and whether a transaction may be fraudulent (e.g., whether there is a high risk of fraud or if the transaction is low risk and likely performed by the account's main user), the service provider may process previous user and merchant transaction data across multiple verticals to identify whether a particular user is likely to purchase within a vertical in a cross-location transaction. The service provider may receive a transaction request between a user in a first location and a merchant in a second location. A user's transaction history may be processed to determine the likelihood or propensity to purchase within verticals from the first location in the second location. Other users' transaction histories that are associated with the first location (e.g., the location of the first user in the transaction) may also be processed to determine their probability or propensity to purchase in the location of the merchant. The service provider may determine a vertical for the transaction and may utilize previously generated risk assessment rules with a risk assessment/fraud detection engine to determine the risk of processing the transaction. The service provider may also process merchant transaction data for that particular merchant (as well as similar merchants or merchants located in the same location) to determine the merchant's propensity to sell from the second location to users in the first location. The merchant's propensity may be processed when determining the risk using the risk assessment rules. Based on the risk, the service provider may then execute an action, including denying the transaction or requesting additional authentication where the transaction is risky. Moreover, the service provider may update rules used by the risk engine based on feedback for the risk assessment (e.g., correct/incorrect) and additional data.

One or more entities, such as personal users or consumers, groups of users, merchants, businesses, or other commercial or governmental agencies, may wish to process a transaction electronically. Such a transaction may be a cross-location transaction across some distance for physical or virtual items, services, and/or benefits. For example, a first user may wish to purchase an item from an online merchant or otherwise engage in electronic transactions. In other embodiments, the first entity may wish to engage in a transfer to another user or purchase from another user. Various service providers may provide transaction processing services that may allow these two or more entities to engage in electronic transaction processing.

The user may further be required to establish the user's account with the service provider in order to engage in electronic transaction processing. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. In order to create an account, the user may be required to select an account name and/or provide authentication credentials, such as a password, personal identification number (PIN), answers to security questions, and/or other authentication information. Such information is susceptible to discovery and fraudulent/malicious use by other users, including by another user that may purchase from merchants in new or unknown locations and/or in different or new verticals. For example, an account takeover action by a malicious user may discover or otherwise access the first user's account and use the first user's account for fraudulent purchases and/or transfers. Similar information as that discussed above may also be provided by a merchant involved in a transaction. However, in other embodiments, the merchant's account may be external to the service provider and/or other data may be used to establish the merchant's account.

The user's account may then be used by the first user, as well as malicious users during an account takeover or other fraudulent access, to perform electronic transaction processing. A computing device may execute a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of users, merchants, and other entities.

A transaction may therefore be created and processed through an account of a user. The user may access one or more interfaces for a merchant (e.g., in a merchant application or website), generate the transaction, and provide the account for transaction processing from a first location or when the account is associated with the first location (e.g., registered as the shipping/billing address or the first address is provided as the shipping address). For example, a graphical user interface of a device used to access the account (e.g., through an authentication process and an account access portal in a website or a dedicated application) may display the interfaces and allow a user to interact with the merchant in a second location. The service provider may receive a transaction processing request, which may include the transaction information, the first location, and the second location. A malicious user may similarly perform such actions during an account takeover.

Thus, an account takeover may occur when the malicious user gains fraudulent access to the first user's account and utilizes the first user's account without permission and/or knowledge by the first user. Other types of fraud may also result in fraudulent electronic transaction processing without knowledge by the first user, and/or without consent of the first user, such as data manipulation or fraudulent data provision during transaction processing. To combat this, the service provider may perform a risk and/or fraud assessment at the time of electronic transaction processing, which may detect whether the first user's account is being used fraudulently. Such processes may utilize data known or accessible for the transaction to make an assessment of whether the transaction is fraudulent, for example, by using past transaction data for the user's account, the merchant's account, and/or other user/merchant accounts. In order to perform a risk assessment using a risk/fraud detection and prevention engine having one or more transaction processing rules to identify fraud and reduce risk, the service provider's system (e.g., the fraud detection engine) may identify a corresponding vertical for the transaction and/or item(s) in the transaction. A vertical may correspond to a particular categorization or market where merchants offer items and/or services in a particular industry, item type, trade, or need for a group of consumers. Thus, a vertical categorization may correspond to a grouping or identification for a transaction or items/services within the transaction (e.g., cars, toys, gaming, fashion, cellphones, etc., as well as sub-categories within a large category such as auto-parts for cars or shirts for fashion). The transaction may correspond to a vertical used to categorize the transaction and item type in the transaction.

Additionally, the service provider may determine a location for the user, account of the user, and/or device used when processing the transaction. Location data for the user may include an IP address, a billing/shipping address, a GPS location of a device, or other information that indicates a location used in the session to generate the transaction. The engine may also use the merchant's location and/or account information for the merchant and/or merchant's account, which may include similar location information used to determine a location of the merchant for providing a payment, shipping an item, or providing the item to the user. User previous transaction information may also be accessed and may be pre-processed to calculate the user's transactions frequency in each vertical that user has purchased items in and performed transactions. For example, an account transaction history may be processed to identify each vertical that the user purchased items in (e.g., fashion, cars, electronics, etc.) and a number of transactions per vertical over a selected period of time (e.g., the last six months or one year). The verticals for the user's account transaction history may then be clustered by location (e.g., state, country, etc.), so that a number of transactions in each vertical is further identified with the particular location that the item/service is purchased from (e.g., where the merchant/seller resides or ships/provides the purchased item). This may be performed for the user, as well as other users of the service provider to identify clusters and bin a collection of users into particular groups or clusters depending on their purchasing behavior. The user's transaction history is further used to cluster similar users by using k-means algorithm. Multiple features are derived from user's transaction data to create input features for the k-means algorithm. These input features may include user location, transaction location (e.g., state, country, etc. of seller), transaction count in each vertical, and temporal proximity of transactions. The temporal proximity may be determined by calculating the average time difference between each of a user's two consecutive transactions. After calculating the cluster identification for each user by a k-means algorithm, the users' data are binned based on the cluster identification.

Additionally, the service provider may similarly process merchant transaction data for the merchant in the transaction as well as other merchants. K-means clustering may be used to identify merchant clusters of transactions per country in a vertical by using the k-means clustering algorithm of pre-processed merchant transaction data for past transactions by merchants. Thus, merchant clusters may identify similar merchants in locations that sell items in a vertical to users in another location (e.g., one or more merchants in one country that sell in a vertical, such as cars, to users in another country). Such data may be accessed and used in real-time as the engine determines the fraud assessment for processing the transaction. The engine may perform real-time processing of the data to determine a risk or fraud assessment of processing the transaction using the user's account. However, in other embodiments, the user/account past transaction information and/or the merchant transaction information may be preprocessed so that user clusters and transactions per vertical for the user, merchant, and/or other users may be previously determined and used in the fraud detection engine.

The risk of fraud assessment may be based on one or more rules, weights, or processing algorithms to determine the risk score or fraud assessment. Such rules or weights may provide different factors to data when determining the score, so that certain account or location data for a transaction in a vertical is more or less likely to be fraudulent.

Using clustered data for a user, the merchant, and/or other users/merchants, the service provider may generate one or more risk rules that define the propensity, probability, or likelihood that a user in one location will purchase an item in a vertical from another location. In order to generate rules, the service provider's fraud detection engine may apply association rule mining machine learning to the clustered data to identify the propensity for a user (e.g., using the account) to purchase from a merchant in a cross-location transaction and the merchant's propensity to sell to the user in the cross-location transaction.

Association rule mining may utilize relationships between the variables of the clustered user/merchant transaction data to identify vertical rules that indicate whether purchases in other verticals in a cross-location transaction are high risk, low risk, or otherwise indicate potential fraud. Association rule mining may use machine learning to identify which verticals are often purchased together or by the same users, such as verticals that users commonly purchase in based on their transaction histories or verticals that often are not shared or found together in the users' transaction histories. This may be used to identify rules for groups of users based on their commonly found/shared verticals and verticals that are not commonly shared in a transaction history based on the user/account location and merchant location.

Association rule mining on a data set of users purchasing in verticals from a merchant may define the propensity for the user to purchase in another vertical. For example, a group of users may purchase in five verticals for a merchant, verticals A, B, C, D, and E. If there is a correlation that groups of users from one country purchase in vertical A, vertical B, and vertical C from the merchant in another country, then when another user that has previously purchased in verticals A and B makes a new purchase in vertical C from the merchant (e.g., has not previously purchased in vertical C), a rule of the machine learning engine may identify that purchases in vertical C are less likely to be fraudulent because vertical C is often associated with and has a relationship with verticals A and B in the clustered data set. However, if there are no other purchases or few purchases in vertical D and E when the group of users purchase previously in verticals A, B, and C, then if the user uses an account in the first country to purchase in vertical D or E from the merchant in another country after only purchasing in vertical A and B from the second country and/or particular merchant, the machine learning engine may utilize association rule mining to generate and identify a vertical rule that indicates the transaction is risky or may be fraudulent. By performing multiple iterations of data processing over large data sets, similarities between different verticals may be determined and those verticals that are commonly purchased together from and/or in the same locations may be determined, as well as items that are uncommonly co-purchased or shared in the same transaction history. Thus, risk rules may be generated by identifying such similarities and differences.

Once the transaction vertical and user/merchant locations are identified, the machine learning engine may process the transaction with the vertical risk rules that define which verticals are commonly shared in a user's transaction history (e.g., found in the same transaction history) or are not commonly shared by users based on the user/merchant locations. The engine may determine a fraud/risk assessment, which may correspond to a score, probability, or other measurement of the transaction risk for potential fraud. Based on the measurement, the service provider may determine whether the transaction information (e.g., locations) in that particular vertical indicates that the transaction is or could be fraudulent.

A threshold score may also be required to be met to determine whether a transaction is considered safe and therefore allowable, or conversely, whether the transaction information indicates potential fraud and should be stopped, examined, or flagged for review. In response to the fraud assessment, the service provider may then execute a navigation action based on the processing request. For example, the processing request may request payment to the merchant using the account. The fraud assessment may indicate whether the transaction is low risk and therefore allowed to be processed using the user's account, or whether the transaction appears to be fraudulently processed using user's account, such as during an account takeover, and therefore should not be allowed to be processed. If the transaction appears to be valid, the service provider may process the transaction through the account based on the initial processing request (e.g., the transaction information with the provided account information including account token or authentication credentials entered during transaction processing).

However, if the transaction appears to be fraudulent based on the fraud assessment by the engine, the service provider may prevent the transaction from being processed using the account. The service provider may navigate the user's account/device to an interface notifying the user/device of the fraud, which may request additional authentication information to overcome the fraud indication and allow access/use of the account in the transaction. The service provider may further gather additional account/device information, which may later be used to update the engine with factors used to make fraud assessments.

Additionally, the service provider may execute another process to correct the fraud, such as alerting an administrator and/or flagging the transaction for an administrator reversal action, or automatically rolling back the transaction. The service provider may also receive feedback from the user and/or merchant, which may indicate whether the fraud assessment was correct or incorrect. For example, if the first user further requests for the transaction to proceed in an authenticated environment, the fraud assessment may be indicated as incorrect. However, if the user requests transaction reversal, refunding, and/or rollback, the fraud assessment may be indicated as correct. Using the feedback, the determined rules using the clustered data may be updated and the number of transactions per vertical in locations for the user/merchant may be changed and updated.

Using the feedback, a machine learning process of the service provider's engine may be executed to update parameters and data for the engine, change weights and/or data considerations by the engine, or otherwise update the engine based on the correctness of the fraud assessment. The aforementioned data factors may be updated based on the feedback, as well as changing real-time data, and weights may be adjusted based on the overall value of data points within the engines processing considerations. The engine may also receive metrics for false negative, true negative, false positive, and true positive outcomes of the fraud assessment, and may determine misclassifications of transaction location processing within verticals based on the outcome results of the fraud assessment. Thus, the engine may determine an accuracy of the engine, which may be used to update data considerations and weights applied to data in the fraud assessment determination. The engine may continue to execute the machine learning process with further fraud assessments to continue updating the engine, which may then be used to provide more accurate fraud assessments based on changing data, parameters, and/or data weights.

Thus, the service provider may utilize real-time data accrued during a transaction to make a real-time fraud assessment and decision of whether to allow transaction processing during a cross-location transaction by a user from a merchant in a new location and/or for an item in a new vertical. This allows fraud assessment to occur at a time prior to completion of processing an electronic transaction with a fraudulently acquired or accessed account, and provides increased online protection from security risks imposed by remote data processing and user interaction over a network. This is increasingly necessary with remote online transaction processing and account use, where in-person identification and authentication is not possible. Thus, when online security risks pose threats to account takeover and remote malicious user use of an account, the systems and processes disclosed herein may provide increased online security and risk prevention.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a merchant device 120, and a transaction processor server 130 in communication over a network 150. User device 110 may be utilized to access the various features available for user device 110, which may include processes and/or applications associated with transaction processing for a transaction with merchant device 120. During electronic transaction processing, transaction processor server 130 may utilize a machine learning engine to assess a risk of fraud and process the transaction based on risk rules generated by the engine.

User device 110, merchant device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with merchant device 120, and/or transaction processor server 130. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may correspond to a device of a consumer or a fraudulent party utilizing an account during electronic transaction processing with a disparate entity, such as the merchant associated with merchant device 120. Although only one communication device is shown, a plurality of communication devices may function similarly.

User device 110 of FIG. 1 contains a purchase application 112, other applications 114, a database 116, and a communication module 118. Purchase application 112 and other applications 114 may correspond to executable processes, procedures, and/or applications with associated hardware. In other embodiments, user device 110 may include additional or different modules having specialized hardware and/or software as required.

Purchase application 112 may correspond to one or more processes to execute software modules and associated devices of user device 110 to process electronic transactions over a network with one or more other services and/or users. In this regard, purchase application 112 may correspond to specialized hardware and/or software utilized by a user of user device 110 that may be used to access a website or an application interface of a merchant or service provider that allows user device 110 to select items for purchase and engage in electronic transaction for the items with the merchant. Purchase application 112 may utilize one or more user interfaces, such as graphical user interfaces presented using an output display device of user device 110, to enable the user associated with user device 110 to process the transaction. In various embodiments, purchase application 112 may correspond to a general browser application configured to retrieve, present, and communicate information over the Internet (e.g., utilize resources on the World Wide Web) or a private network. However, in other embodiments, purchase application 112 may include a dedicated application of transaction processor server 130 or other entity (e.g., a merchant), which may be configured to assist in processing transactions electronically.

During electronic transaction processing, purchase application 112 may be utilized to select payment instrument(s) for use in providing payment for a purchase transaction, transfer, or other financial process. As discussed herein, purchase application 112 may utilize user financial information, such as a credit card, bank account, or other financial account, as a payment instrument when providing payment information. Additionally, purchase application 112 may utilize a digital wallet stored with an account with a payment provider, such as transaction processor server 130, as the payment instrument, for example, through accessing a digital wallet or account of a user with transaction processor server 130 through entry of authentication credentials and/or by providing a data token that allows for processing using the account. However, since the authentication credentials (e.g., username, password, PIN, etc.) and/or token may be stolen, spoofed, or otherwise misappropriated, a fraudulent user may utilize purchase application 112 to fraudulently use an account of another user and process transactions. Thus, purchase application 112 may be utilized to view the results of payment, for example, using transaction histories, dispute resolution processes, and other post-transaction process. The results may include fraud assessments and reversed transactions based on fraud assessments. Purchase application 112 may further be used to access and/or navigate to one or more interfaces to provide feedback based on the fraud assessment, which may be utilized by transaction processor server 130 during machine learning of past fraud assessments. Additionally, purchase application 112 may be used to provide further authentication during transaction processing to override a declined transaction based on a fraud assessment.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for user device 110 and processes the location information to determine a location of user device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of user device 110, such as display devices capable of displaying information to users and other output devices, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with purchase application 112 and/or other applications 114, identifiers associated with hardware of user device 110, or other appropriate identifiers, such as identifiers used for payment/user/device authentication or identification, which may be communicated as identifying user device 110 to transaction processor server 130. Database 116 may include transaction information for previously processed transactions, including a list of merchants, verticals, and locations of the transactions, which may be used by transaction processor server 130 when assessing fraud and creating risk rules using a fraud/risk assessment engine.

User device 110 includes at least one communication module 118 adapted to communicate with merchant device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 120 may be implemented as a computing device that may utilize appropriate hardware and software configured for wired and/or wireless communication with user device 110 and/or transaction processor server 130. For example, in one embodiment, merchant device 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Merchant device 120 may be used to provide item sales data over a network to user device 110 for the sale of items, for example, through an online merchant marketplace. Thus, in certain embodiments, merchant device 120 may be used to host a website and/or provide website or application data for use in item sales; however, merchant device 120 may also provide item sales through another service provider's platform. In certain embodiments, merchant device 120 may also provide sales through a physical merchant location. Although only one device is shown, a plurality of devices may function similarly.

Merchant device 120 of FIG. 1 contains a merchant sale application 122, other applications 124, a database 126, and a communication module 128. Merchant sale application 122 and other applications 124 may correspond to executable processes, procedures, and/or applications with associated hardware. In other embodiments, merchant device 120 may include additional or different modules having specialized hardware and/or software as required.

Merchant sale application 122 may correspond to one or more processes to execute modules and associated specialized hardware of merchant device 120 that provide sales, checkout, and payment processes for a transaction to purchase one or more items for sale from the merchant corresponding to merchant device 120. In this regard, merchant sale application 122 may correspond to specialized hardware and/or software of merchant device 120 to provide a convenient interface to permit a merchant to enter, view, and/or edit items and/or services available for purchase. For example, merchant sale application 122 may be implemented as an application having a user interface enabling the merchant to enter item information and request payment one or more items/services through a transaction with a user, such as the user associated with user device 110. In certain embodiments, merchant sale application 122 may correspond more generally to a web browser configured to provide information available over the Internet or access a website corresponding to the merchant and/or transaction processor server 130. Thus, merchant sale application 122 may provide item sales through an online marketplace using the website of the merchant. In further embodiments, merchant sale application 122 may also provide transaction processing for other types of transactions, such as transactions requested in-person or over a communication session (e.g., phone call) from a user using a payment account with transaction processor server 130.

Once a payment amount is determined for a transaction for items to be purchased by a customer, the merchant may request payment from the customer, for example, through an account with transaction processor server 130. The provided transaction information may be communicated to merchant device 120 with the transaction or input by a merchant to merchant device 120. A service provider server, such as transaction processor server 130, may process the transaction with the provided transaction information and determine whether to approve or decline the transaction based on risk analysis for transactions in that vertical based on the account and merchant locations. Merchant sale application 122 may then receive the results of the transaction processing, and complete the transaction with the customer, for example, by providing the customer the items for the transaction or declining the transaction where the customer is not authenticated or the transaction is not authorized (e.g., a high risk indication of fraud status).

In various embodiments, merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a merchant to send and receive emails, calls, texts, and other notifications through network 150. In various embodiments, other applications 124 may include financial applications, such as banking applications that may be used with merchant sale application 122 for processing transactions. Other applications 124 may also include other location detection applications, which may be used to determine a location for the user, such as a mapping, compass, and/or GPS application, which can include a specialized GPS receiver that obtains location information for merchant device 120. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use components of merchant device 120 for the output of data.

Merchant device 120 may further include database 126 stored on a transitory and/or non-transitory memory of merchant device 120, which may store various applications and data and be utilized during execution of various modules of merchant device 120. Database 126 may include, for example, identifiers such as operating system registry entries, cookies associated with merchant sale application 122 and/or other applications 124, identifiers associated with hardware of merchant device 120, or other appropriate identifiers, such as identifiers used for payment/user/device authentication or identification. In various embodiments, database 126 may include transaction information and fraud determinations by transaction processor server 130.

Merchant device 120 includes at least one communication module 128 adapted to communicate with user device 110 and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., merchant device 120) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing services on behalf of users and/or merchants including generation, use, and/or fraud/risk analysis services for transaction processing. In this regard, transaction processor server 130 includes one or more processing applications which may be configured to interact with user device 110, merchant device 120, and/or another device/server to facilitate transaction processing. In one example, transaction processor server 130 may be provided by PAYPAL®, Inc. of San Jose, Calif., USA. However, in other embodiments, transaction processor server 130 may be maintained by or include another type of service provider, which may provide services to a plurality of users.

Transaction processor server 130 of FIG. 1 includes a risk assessment engine 140, a transaction processing application 132, other applications 134, a database 136, and a network interface component 138. Risk assessment engine 140, transaction processing application 132, and other applications 134 may correspond to executable processes, procedures, and/or applications with associated hardware. In other embodiments, transaction processor server 130 may include additional or different modules having specialized hardware and/or software as required.

Risk assessment engine 140 may correspond to one or more processes to execute software modules and associated specialized hardware of transaction processor server 130 to analyze transaction and account information for an account, a merchant, and other consumers/merchants, generate consumer and merchant vertical lists based on verticals, locations, and number of transactions, and further determine a fraud analysis for a transaction based on the vertical propensity to purchase within a vertical in a cross-location transaction based on risk analysis rules. In this regard, risk assessment engine 140 may correspond to specialized hardware and/or software to receive transaction information and/or access account information for determination of consumer and merchant vertical lists. The consumer vertical list may be generated based on transactions processed by transaction processing application 132 for an account, and may correspond to all verticals that the account purchased an item in and a number of transactions completed by the account in each vertical. The verticals are further organized by location, such as city, state, country, or similar geographic region. This list for the account used by user device 110 may further be aggregated and/or clustered with other consumer accounts for a particular location and/or for a particular merchant. By clustering these accounts, specific association rules may be generated.

Additionally, merchant vertical lists may be determined for a merchant associated with merchant device 120 and for similarly situated merchants, such as merchants selling in the same verticals and/or within the same or similar geographic region. The merchant vertical list may be organized by verticals and transactions per vertical, as well as consumer purchase location for the transaction, for example, where the merchant sells items in the vertical at. Once the consumer vertical lists and merchant vertical lists are generated, similar merchants and consumers may be determined through clustering algorithms, such as k-means clustering that identifies particular common traits or observations between consumers and merchants and their respective vertical transaction per location lists. After clustering similar consumers and merchants, association rule mining may be applied by a machine learning process of risk assessment engine 140 to identify particular common associations between verticals that a consumer purchases in, and locations of the consumer and the correspond merchant for the transactions. For example, a rule may identify that consumers in a particular cluster that purchase in A, B, and C verticals are further likely to purchase an item in vertical A categorization from location D while located in location E. A similar machine learning rule may instead identify that those same consumers may be unlikely to purchase an item in vertical B categorization from location D (or another location) while the consumers are located in location E. The location may correspond to a transaction location and/or location associated with the account. The rules may correspond to a certain propensity, such as a ranking, percentage, or score. Similarly, merchants within a similar cluster may be designated for their propensity to sell in a particular vertical to certain locations while located in a certain geographic location. Once the rules are generated, risk assessment engine may process transactions. Additionally, risk assessment engine may continuously process new transaction data and feedback to update rules.

Risk assessment engine 140 may then execute an action based on a received transaction. The action may correspond to a fraud assessment and/or risk analysis. The assessment may determine how likely the transaction is to be fraudulent, and may consider the transaction information (e.g., the consumer's location that is attempting to purchase an item, the merchant's location that is selling the item, and the item's vertical categorization), as well as the risk rules determined by risk assessment engine 140 for the locations and item vertical. Additionally, the consumer's and/or merchant's specific vertical list may be used as an additional assessment calculation or weight so that additional consideration may be given to particular consumers or merchants that behave differently than those in the same or similar clusters. Based on the assessment, risk assessment engine 140 may output a fraud or risk determination to transaction processing application 132, user device 110, and/or merchant device 120, which may allow the transaction or prevent the transaction. Risk assessment engine 140 may further request additional authentication to proceed with the transaction based on the determination. Risk assessment engine 140 may receive feedback for various outcomes of the fraud assessment, and may revise the parameters, rules, and/or vertical calculations based on such data.

Transaction processing application 132 may correspond to one or more processes to execute software modules and associated specialized hardware of transaction processor server 130 to provide payment and transaction processing services to merchants and users, for example, though an account and/or payment instruments of the user to an account of the merchant, where the service may include fraud assessment processes provided by risk assessment engine 140. In this regard, transaction processing application 132 may correspond to specialized hardware and/or software to provide transaction processing and payment services through accounts, including digital wallets storing payment instruments. The services may allow for a payment through a payment instrument, including a credit/debit card, banking account, payment account with transaction processor server 130, and/or other funding instrument. In order to establish an account to send and receive payments, transaction processing application 132 may receive information requesting establishment of the account. The information may include user personal, business, and/or financial information. Additionally the information may include a login, account name, password, PIN, or other account creation information. The entity establishing the account may provide a name, address, social security number, or other personal or business information necessary to establish the account and/or effectuate payments through the account. Transaction processing application 132 may further allow the entity to service and maintain the payment account, for example, by adding and removing funding instruments.

Transaction processing application 132 may be used to provide a payment for a transaction. Prior to processing the transaction, risk assessment engine 140 may perform a fraud or risk analysis on the transaction data, including the classified vertical categorization or verticals for the transaction and the buyer and seller locations. Based on a fraud assessment, transaction processing application 132 may approve or deny the transaction, or may require additional authentication for the transaction. Transaction processing application 132 may also be used to reverse a fraudulent transaction, as well as process an electronic transaction that is not fraudulent. Transaction processing application 132 may debit an account of the user and provide the payment to an account of the merchant. Transaction processing application 132 may also be used to provide transaction histories for processed transactions.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birth date, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from user device 110, one or more digital wallets and/or payment accounts belonging to the users may be found. Database 136 may also store consumer and merchant vertical lists determined using transaction data and account/device locations, as well as consumer and merchant clusters and risk rules determined for cluster generated using the vertical lists. Additionally, fraud assessments, tools used to determine fraud assessments, and feedback from fraud assessments may be stored in database 136.

In various embodiments, transaction processor server 130 includes at least one network interface component 138 adapted to communicate user device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figures 2A, 2B:
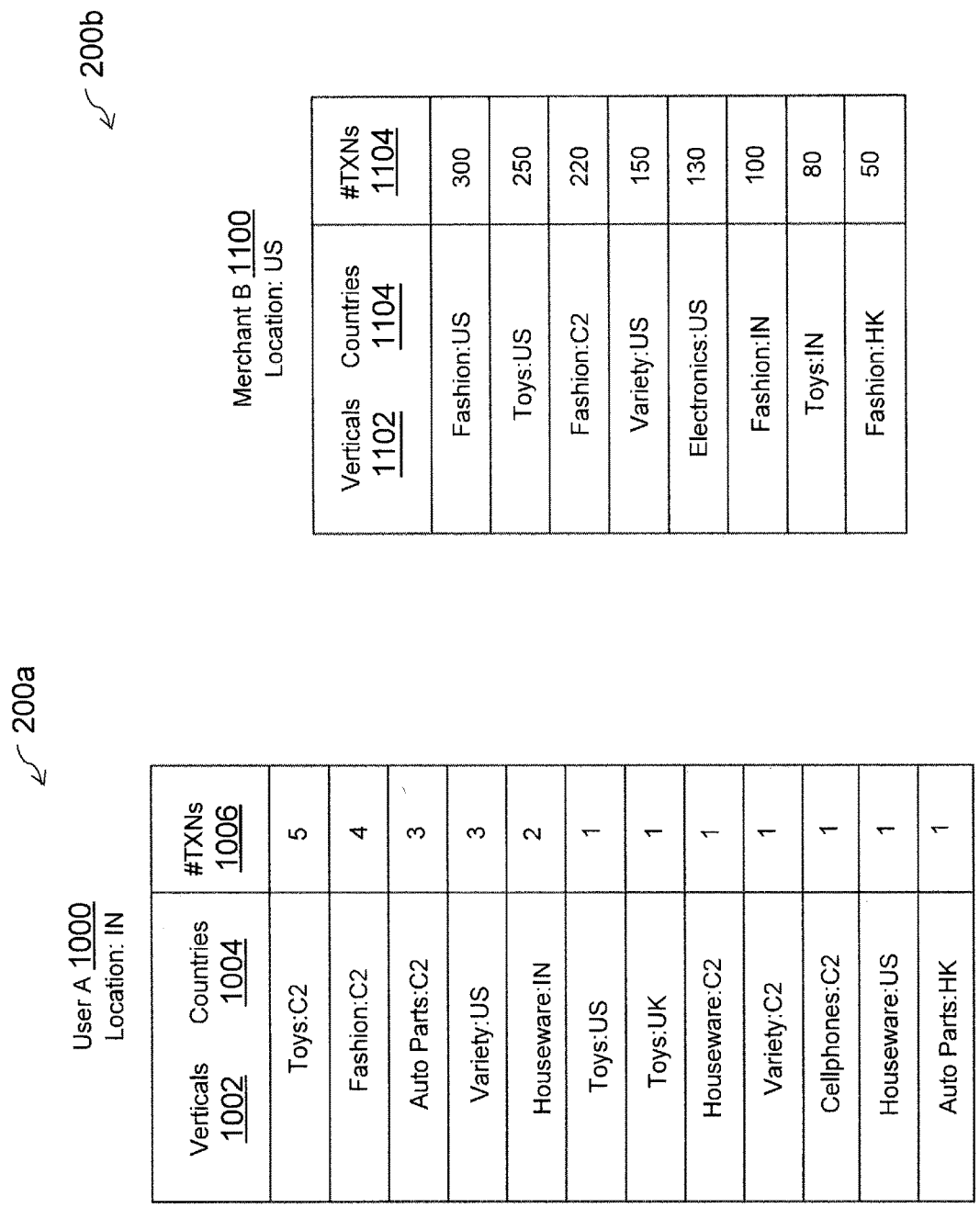
FIG. 2A is an exemplary block diagram of a customer vertical list sorted by location of transaction and number of transactions in each vertical, according to an embodiment.
FIG. 2B is an exemplary block diagram of a merchant vertical list sorted by location of transaction and number of transactions in each vertical, according to an embodiment.

FIG. 2A is an exemplary block diagram of a customer vertical list sorted by locations of transactions and number of transactions in each vertical, according to an embodiment. Environment 200a includes a vertical list for a user A 1000 generated by a machine learning process, such as one provided by risk assessment engine 140 of transaction processor server 130 described in system 100 of FIG. 1. In this regard, the vertical list may be generated based on a transaction history for an account of a user A 1000 location in "IN" that is provided by transaction processor server 130 and/or used to process transactions with a merchant, such as the merchant associated with merchant device 120 described in system 100 of FIG. 1.

User A's transaction history is organized into the vertical list that includes verticals 1002 organized by countries 1004, and a number of transactions 1006 for each country specific to one of verticals 1002 (e.g., organized by countries 1004). Verticals 1002 may each correspond to a grouping, organization, or characteristic type for items purchased in transactions, such as "toys," "fashion," or "variety." Each of verticals 1002 has a corresponding transaction found in the user A 1000's account transaction history, such as a purchase of an item in that vertical. Moreover, each of verticals 1002 has one of countries 1004 where user A 1000 purchased the transaction from, such as where the corresponding seller or merchant is located for the transaction. The transaction history may be limited in scope to only go back a certain amount of time to give preference to recent transactions. Number of transactions 1006 correspond to the number of transactions found in a particular one of verticals 1002 in one of countries 1004. For example, number of transaction 1006 for "toys" in country "C2" includes 5 transactions, while "fashion" in country "C2" has 4 and "variety" in "US" has 1. This further shows that the same verticals in different countries may include different measurements, for example, "toys" in country "C2" having 5 transactions and "toys" in country "US" having 1 transaction. Thus, the vertical list for user A 1000 may correspond to processed and organized data from user A 1000's account transaction history that may be clustered with other similar consumers using a clustering algorithm to generate risk rules.

FIG. 2B is an exemplary block diagram of a merchant vertical list sorted by location of transaction and number of transactions in each vertical, according to an embodiment. Environment 200b includes a merchant B 1100's transaction history organized into a vertical list generated by a machine learning process, such as one provided by risk assessment engine 140 of transaction processor server 130 described in system 100 of FIG. 1. In this regard, the vertical list may be generated for merchant B 1100 based on their consumer transactions from a location "US," for example, by aggregating vertical lists for merchant B 1100's consumers or processing merchant account transaction history.

Merchant B 1100's transaction history is organized into a vertical list that includes verticals 1102 organized by countries 1104, and a number of transactions 1106 for each country specific to one of verticals 1102 (e.g., organized by countries 1104). Verticals 1102 may each correspond to a grouping, organization, or characteristic type of items sold by merchant B 1100 to its consumers, such as "fashion," "toys," or "electronics," and correspond to a transaction found in the merchant B 1100's transaction history. For example, the vertical list may correspond to a list of only those verticals sold by merchant B 1100 and for transactions between specifically merchant B 1100 and its consumers. Each of verticals 1102 is further organized into one of countries 1104 where merchant B 1100 sold an item, for example, the location of the buyer or consumer purchasing an item. Number of transactions 1106 corresponds to the number of transactions found in a particular one of verticals 1102 that are organized by countries 1104. For example, number of transactions 1106 for "fashion" in country "US" includes 300 past transactions sold by merchant B 1100 to its consumers in country "US", while "toys" in "US" has 250 and "fashion" in "IN" has 100. Thus, the vertical list for merchant B 1100 may correspond to processed and organized data from a merchant B 1100's account transaction history that may be clustered with other similar merchants using a clustering algorithm to generate risk rules.

Figure 3A:
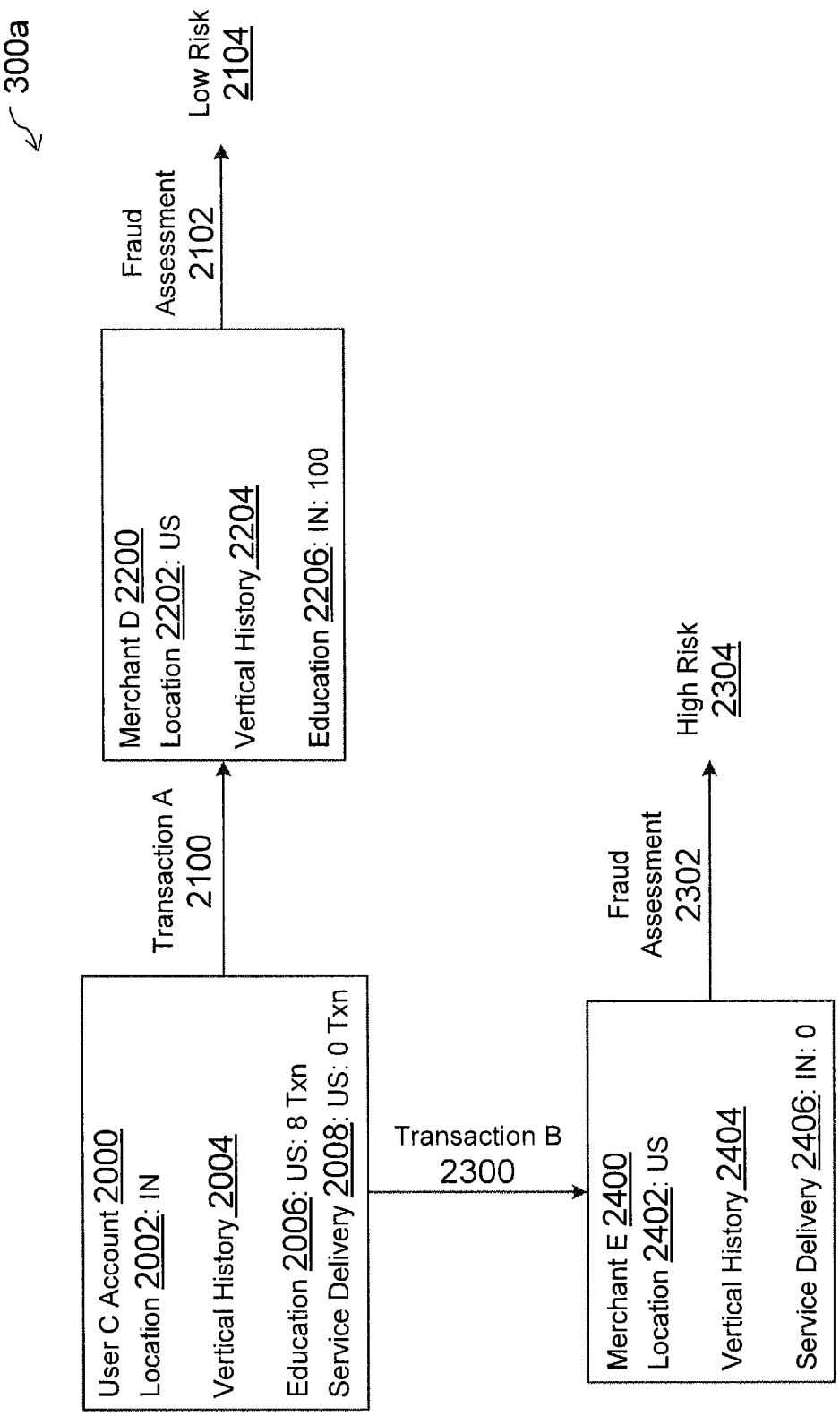
FIG. 3A is a flowchart of an exemplary process for two fraud assessments based on transaction processing for a transaction vertical in different locations, according to an embodiment.

FIG. 3A is a flowchart 300a of an exemplary process for two fraud assessments based on transaction processing for a transaction vertical in different locations, according to an embodiment. Flowchart 300a includes exemplary data for two different transactions that may be processed using a machine learning process of a fraud detection engine for determination of a fraud assessment.

In flowchart 300a, a user C account 2000 may be in location 2002 shown as "IN." Additionally, user C account 2000 may include a vertical history 2004, such as an education vertical 2006 having 8 processed transactions from a "US" location. Vertical history 2004 further includes a service delivery vertical 2008 having 0 transactions from the "US" location. Based on vertical history 2004, user C account 2000 may be clustered with other similar accounts and transaction risk rules may be determined and/or identified for user C account 2000.

When user C account 2000 processes transaction A 2100 with merchant D 2200 in location 2202 corresponding to "US," the risk assessment engine may determine a risk score for fraud assessment 2102 based on vertical history 2204 for merchant D 2200. Vertical history 2204 may include education vertical 2206 having 100 transaction in the "IN" location. Transaction A 2100 may include an item in the education vertical categorization, and thus match user C account 2000's education vertical 2006 in location 2202 for merchant D 2200. Transaction A 2100 having the item in that education vertical categorization may also match merchant D 2200's education vertical 2206 having 100 transaction in location 2002 for user C account 2000. Fraud assessment 2102 may utilize a rule that associates vertical history 2004 for user C account 2000 with purchasing in location 2202 for the education vertical categorization and further indicates a propensity for vertical history 2204 for merchant D 2200 to sell at location 2002. Thus, fraud assessment 2102 may return a low risk result 2104.

Conversely, during an account takeover, user C account 2000 may be used to conduct transaction B 2300 in the service delivery vertical categorization, such as an item that requires service delivery (e.g., flower or other item delivery) from a merchant E 2400 in a location 2402 for merchant E 2400 corresponding to "US." Vertical history 2404 includes 0 transactions for sales in "IN" for service delivery vertical 2406 for merchant E 2400. Thus, merchant E 2400 does not typically sell to customers at location 2002 for user C account 2000. In this regard, fraud assessment 2302 may process vertical history 2004 and vertical history 2404 to determine that no or few transactions overlap, and thus a risk assessment score may include that the transaction has a high risk result 2304.

Figure 3B:
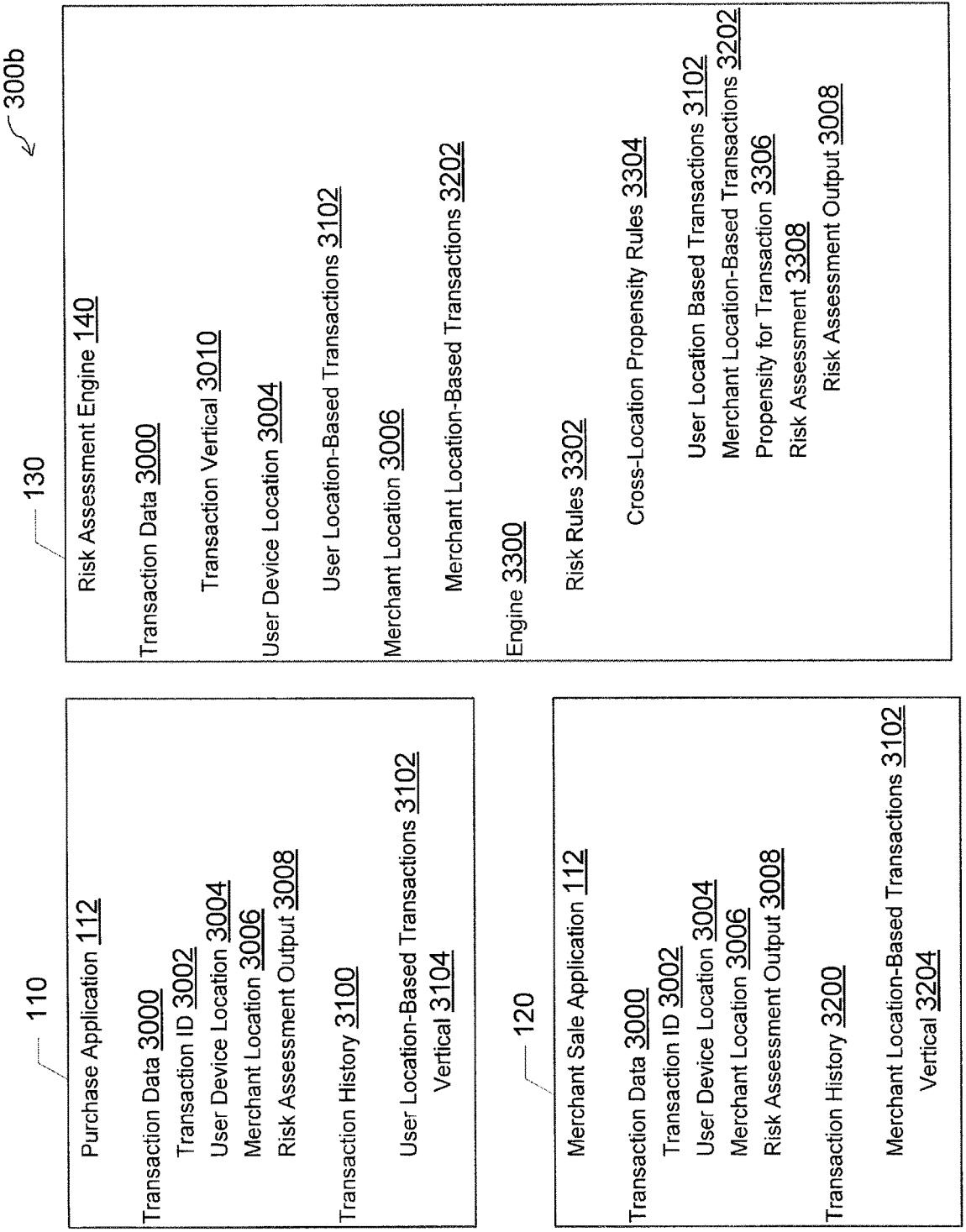
FIG. 3B is an exemplary system environment where a communication device, a merchant device, and a transaction processor server may interact during transaction processing for fraud detection during cross-location online transaction processing, according to an embodiment.

FIG. 3B is an exemplary system environment where a communication device, a merchant device, and a transaction processor server may interact during transaction processing for fraud detection during cross-location online transaction processing, according to an embodiment. Environment 300b of FIG. 3 includes user device 110, merchant device 120, and transaction processor server 130 discussed in reference to system 100 of FIG. 1.

In environment 300b, user device 110 executes purchase application 112 corresponding generally to the processes and features discussed in reference to system 100 of FIG. 1. In this regard, user device 110 may utilize purchase application 112 to initiate a transaction having transaction data 3000, which may include a transaction ID 3002, a user device location 3004 where the transaction is being requested from, and a merchant location 3006. Similarly, in environment 300b, merchant device 120 executes merchant sale application 122 corresponding generally to the processes and features discussed in reference to system 100 of FIG. 1. In this regard, merchant device 120 may utilize merchant sale application 122 to process transaction data 3000.

In order to provide risk assessment output 3008 to user device 110 and merchant device 120, transaction processor server 130 may access transaction history 3100 having user location-based transaction 3102 in verticals 3104 for user device 110 and transaction history 3200 having merchant location-based transactions 3202 in verticals 3204. Transaction processor server 130 may then execute risk assessment engine 140 corresponding generally to the processes and features discussed in reference to system 100 of FIG. 1. Risk assessment engine 140 may determine fraud assessments for transactions including the transaction associated with transaction data 3000. Risk assessment engine 140 may first determine a transaction vertical 3010 for transaction data 3000. Moreover, risk assessment engine 140 may determine consumer based rules of risk rules 3302 for engine 3300 using user device location 3004 and user location-based transaction 3102 using clustering for transaction history 3100 and association based rule mining for those clusters. Moreover, merchant based rules of risk rules 3302 may be determined by utilizing merchant location 3006 with merchant location-based transactions 3202 to identify clusters and similarly using association rule mining based on the clusters to identify patterns in merchant data. Thus, engine 3300 may apply risk rules 3302 to transaction data 3000 to determine cross-location propensity rules for user location-based transaction 3102 and merchant location-based transactions 3202. A propensity for the transaction 3306 may be determined, such as a score or risk likelihood of the specific entities of entering in a cross-location transaction. This may be used to determine a risk assessment 3308 and provide risk assessment output 3008 for user device 110 and merchant device 120.

Figure 4:
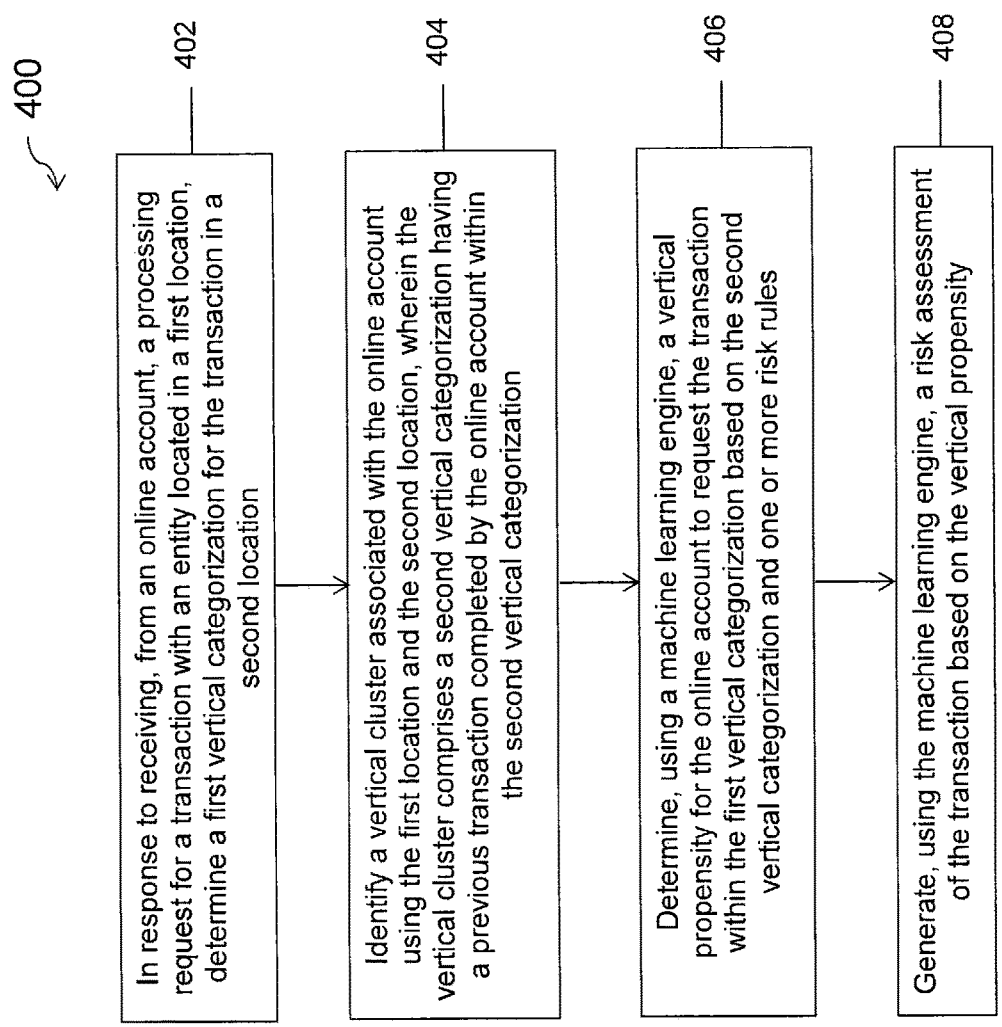
FIG. 4 is a flowchart of an exemplary process for a machine learning engine for fraud detection during cross-location online transaction processing, according to an embodiment.

FIG. 4 is a flowchart of an exemplary process for a machine learning engine for fraud detection following link selection, according to an embodiment. Note that one or more steps, processes, and methods described herein may be omitted, performed in a different sequence, or combined as desired or appropriate.

At step 402 of flowchart 400, in response to receiving a processing request for a transaction with an entity located in a first location, a first vertical categorization for the transaction in a second location is determined. The second location may be determined based on the processing request and/or the online account, for example, by determining an IP address, shipping address, or other geographic indicator during use of the online account. A vertical cluster associated with the online account is identified using the first location and the second location, wherein the vertical cluster comprises a second vertical categorization having a previous transaction completed by the online account within the second vertical categorization, at step 404 of flowchart 400.

At step 406 of flowchart 400, a vertical propensity for the online account to request the transaction within the first vertical categorization is determined, using a machine learning engine, based on the second vertical categorization and one or more risk rules. The risk rules may be determined using a database of risk rules that are generated by the machine learning engine using past transactional data and an association rule mining process utilized by the machine learning engine. For example, the risk rules may identify associations within clusters of accounts, such as the online account and a plurality of other accounts, based on large amounts of similar or dissimilar transactional data. This may be utilized to generate rules for the machine learning engine to determine risk within cross-locational transactions, such as a transaction where the entity sells items within the first vertical categorization in a cross-border transaction with the online account. The clustering may be performed through k-means clustering that partitions accounts into different clusters based on commonly observed vertical similarities between the accounts. For example, shared verticals for the online account and the plurality of other accounts may be identified and the vertical cluster may be generated, where the accounts are further clustered based on common patterns in the number of transactions per vertical and the transaction locations for the vertical.

Thus, the vertical propensity may correspond to a probability for the online account to request a transaction in the first vertical categorization from one or more merchants or other entities that are located within the first location. The vertical propensity may further be based on a location rank for the first vertical categorization based on transactions within the vertical cluster, such as a rank or score that indicates whether transactions within the first vertical categorization between the first and second locations is likely or occurs more often than transactions in other vertical categorizations or locations. This may compare the first vertical categorization having the first and second locations to other vertical categorizations of the vertical cluster for the online account to determine the likelihood of requesting the transaction against other transactions in other verticals and/or locations.

At step 408 of flowchart 400, a risk assessment of the transaction is generated, using the machine learning engine, based on the vertical propensity. Based on the risk assessment, it may be determined that the transaction requires additional authentication in order to process the transaction, such as input of a biometric, verification of a social security or credit card number, two-factor authentication process using a known device, or other information. An authentication request interface may be output to the user and used to enter the additional authentication. If a user properly authenticates use of the online account for the transaction, the vertical propensity, and thus the risk rules for that cluster, may be appropriately updated based on the false positive risk score and the new transaction data for the account's verticals. However, if the transaction is deemed as fraudulent, the account may be locked and the true positive may be used to confirm the risk rules. In certain embodiments, high value or high use accounts may be given particular weight, and further used to determine the risk assessment. After performing the risk assessment and possibly processing the transaction, a transaction processing result may be output to a device associated with the processing request. Thus, the machine learning and/or artificial intelligence portion of the fraud assessment engine may be trained using one or more machine learning algorithms.

Figure 5:
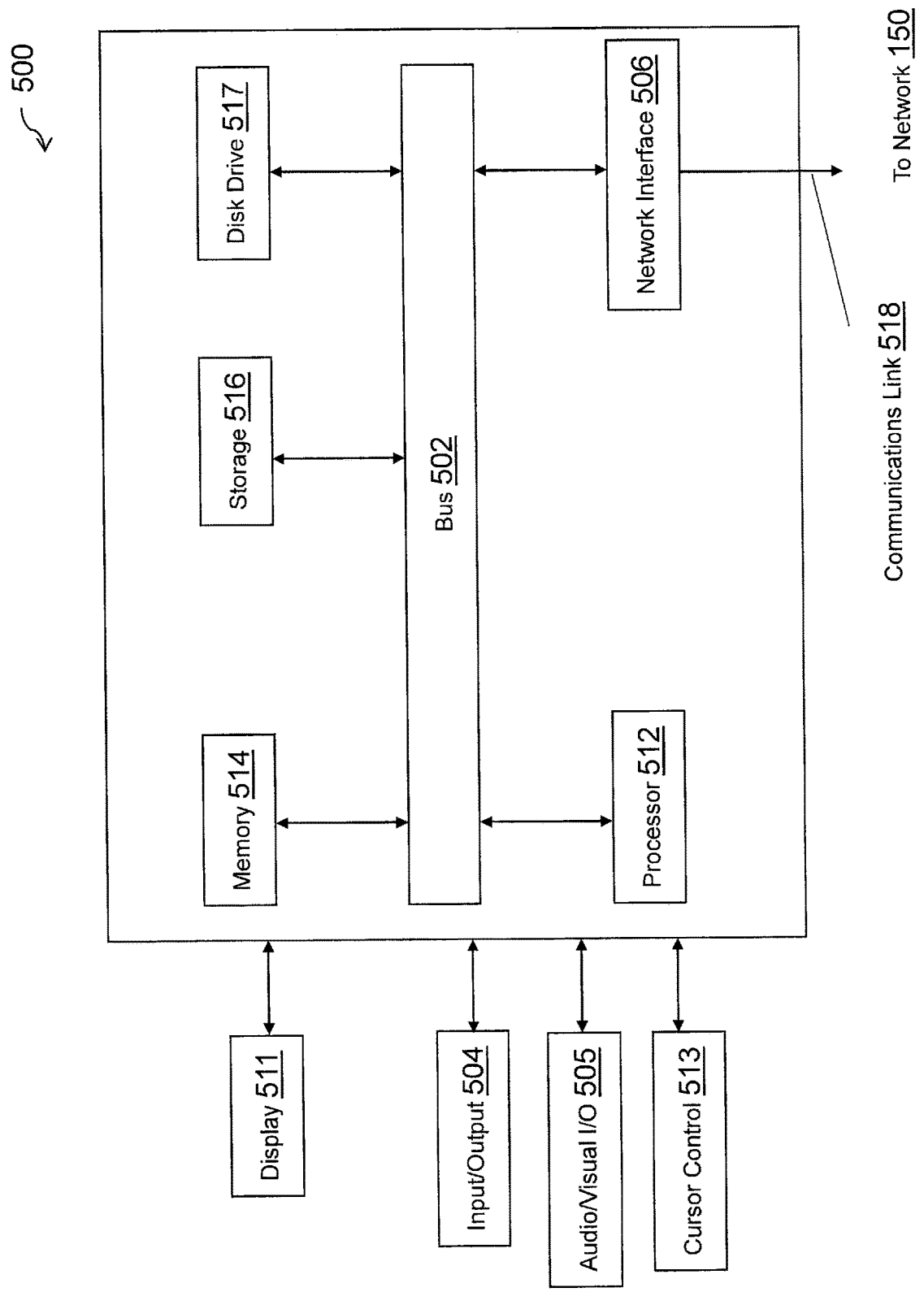
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 6:
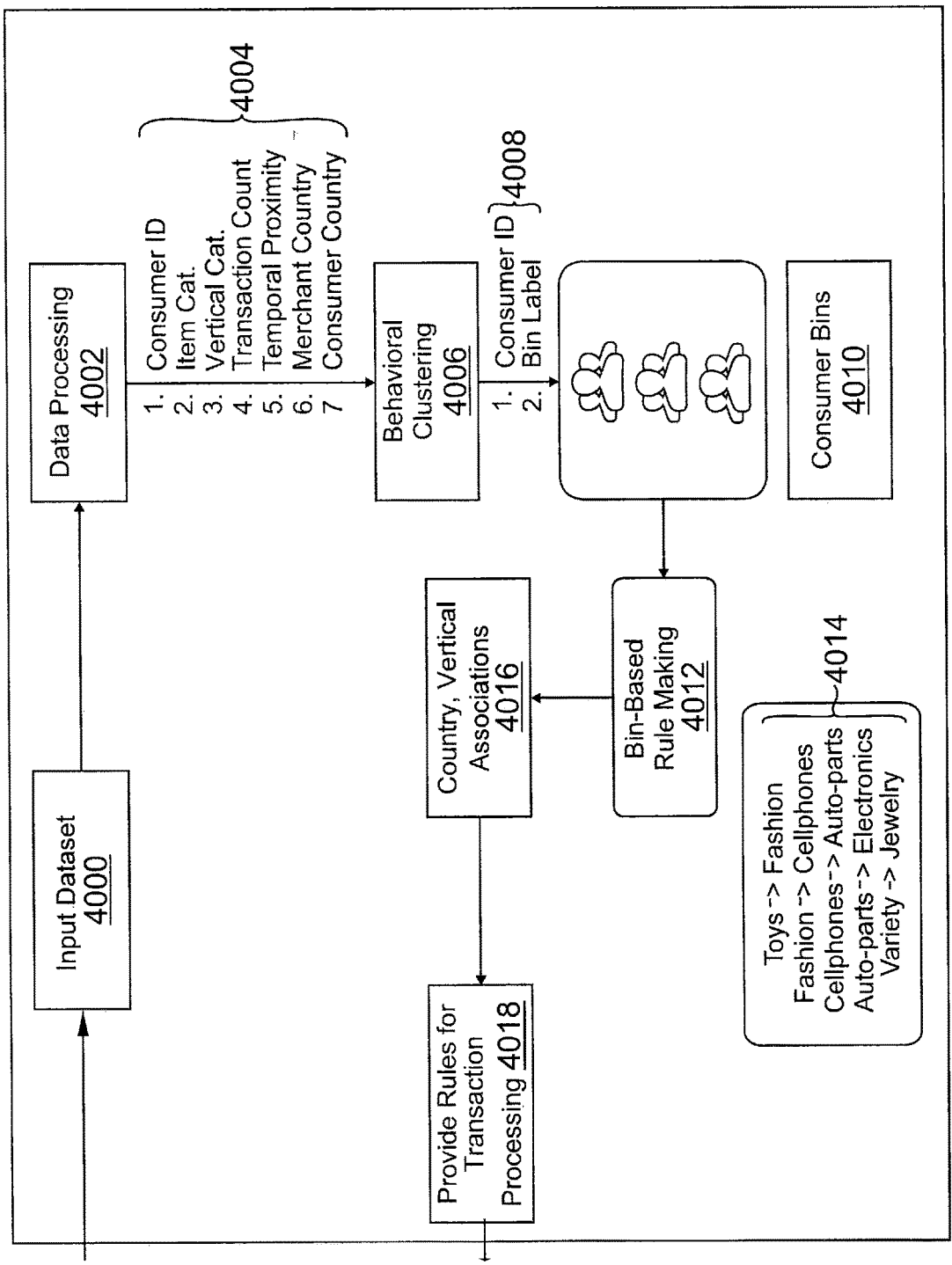
FIG. 6 is a block diagram of a machine learning engine that is trained using cross-location online transaction processing data, according to an embodiment.

FIG. 6 is a block diagram of a machine learning engine that is trained using cross-location online transaction processing data, according to an embodiment. Machine learning engine 600 in FIG. 6 may include executable software instructions performed by a machine learning engine to generate risk assessment rules based on association rule mining processes and provide the risk assessment rules to a fraud detection process for use with received cross-location transactions.

In this regard, an initial input process may accept an input data set 4000, which may correspond to initial transaction histories for a set of consumers with merchants. Data processing 4002 may correspond to a software process that initially extracts particular identifiers and classifications of the data within the transaction histories. Transaction data 4004 may be extracted for the transaction histories. Transaction data 4004 includes identification of a consumer identifier, an item category, a vertical category, a transaction count for each vertical, a temporal proximity of the transactions within the transaction histories, a merchant country, and a consumer country for transaction vertical types within the transaction history. Behavioral clustering 4006 may utilize a k-means clustering algorithm of machine learning engine 600 to group consumers and their transaction histories into consumer bins 4010 using bin data 4008. Bin data 4008 for consumer bins 4010 includes consumer identifiers for consumers in each bin or cluster, where each bin is given a label or other identifier that allows identification of each of bins 4008.

Bin-based rulemaking 4012 may correspond to executable instructions performed by machine learning engine 600 to apply association rulemaking machine learning algorithms that are used to train a fraud detection process. In his regard, bin-based rulemaking 4012 may identify country, vertical associations 4016. Country, vertical associations 4016 may include associations between verticals in particular countries. For example, transactions in the verticals shown in vertical associations 4014 may be used to generate transaction risk rules for vertical associations 4014 and/or update those transaction risk rules based on rules for vertical associations 4014. A first bin or cluster of users in the US may purchase 100 transactions in the toys vertical from a merchant in Canada. That first cluster may also purchase 80 transactions in the fashion vertical from a merchant in France. Bin-based rulemaking 4012 may generate an association risk rule for that cluster that identifies transaction risk for a user in the US that has previous transactions for toys from Canadian merchants. The risk rule may be used to calculate transaction risk for the user when purchasing from French merchants in the fashion transaction vertical type. This may be used to train machine learning engine 600 for particular associations and identify rules for that user based on the user's transaction history and vertical transaction list. The risk rules may therefore recognize one or more correlations between the toys vertical and the fashion vertical, where the risk rules comprises a fraud assessment decision, score, or value based on the correlation.

Machine learning engine 600 may receive additional, continuous, or periodic updates and additional transaction data for input data set 4000, which may be used to generate further risk rules by an association rule making engine or process (e.g., bin-based rulemaking 4012) of machine learning engine 600. For example, the previously discussed first cluster may provide additional transaction data for input data set 4000. This may cause behavioral clustering 4006 to update consumer bins 4010, such as the transaction data for the first bin or cluster of users. The transaction data update for consumer bins 4010 may add new verticals and countries or additional transactions in the verticals.

The further data may be used to refine particular users in each bin and cluster and move or re-cluster the users as necessary. This may cause changes of transaction vertical data (e.g., number of transaction in a verticals), vertical countries for the consumer/merchant in the transaction, and/or vertical type for particular clusters of users. For example, transaction data may expire for the first cluster of users, and toys and fashion verticals in their respective countries may be altered, such as by decreasing the number of transactions in each vertical. Thus, the association risk rule may increase risk of transactions in one of the verticals as the verticals are less associated. However, where additional transaction data increases the number of transactions in a vertical, the association risk rule may recognize a stronger correlation. A new vertical may also recognize a correlation between toys, fashion, and another vertical, such as cellphones. Thus, a risk rule may recognize a correlation between toys and cellphones either directly (e.g., when shared in the same transaction histories) or through fashion where the transaction histories recognize a degree of separation between the verticals.

Vertical associations 4014 further display associations that are separated between different clusters or bins of users. Toys may be associated with electronics for transaction countries based on an association by toys with fashion, fashion with cellphones, cellphones with auto-parts, and finally auto-parts with electronics. This may create a loose association between toys and electronics, and thus a corresponding risk rule may recognize this correlation and generate a rule accordingly. The rule may recognize that a user having previous purchases in the toys vertical within that vertical's countries is unlikely to purchase in the electronics vertical's countries based on the multiple degrees of separation. Conversely if the number of transactions in each vertical indicates a reduced degree of risk (e.g., a high number of transactions, thereby indicating that each vertical is strongly correlated), bin-based rulemaking 4012 may generate a rule that the transaction is less risky. Bin-based rulemaking 4012 may then output these rules to a fraud detection process by providing the rules for transaction processing through fraud process 4018.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A machine learning system for risk rule generation based on mined data association comprising:
   a non-transitory memory storing a database of risk rules generated by a machine learning engine using past transactional data and an association rule mining process utilized by the machine learning engine; and
   one or more hardware processors coupled to the non-transitory memory and configured to execute stored instructions to cause the machine learning system to perform operations comprising:
      in response to receiving, from an online account, a processing request for a transaction with an entity located at a first location, determining a first vertical categorization for the transaction;
      determining a second location associated with the online account based on the processing request;
      identifying a vertical cluster associated with the online account based on the first location and the second location, wherein the vertical cluster comprises a second vertical categorization having a previous transaction completed by the online account within the second vertical categorization;
      determining, using the machine learning engine, a vertical propensity for the online account to request the transaction within the first vertical categorization based on the second vertical categorization and one or more of the risk rules; and
      generating, using the machine learning engine, a risk assessment of the transaction based on the vertical propensity.

2. The machine learning system of claim 1, wherein the vertical propensity comprises a probability associated with purchase transactions by the online account and a plurality of other accounts associated with the second location for purchase of items within the first vertical categorization from entities at the first location.

3. The machine learning system of claim 2, wherein prior to identifying the vertical cluster, the operations further comprise:
   identifying shared verticals for the online account and the plurality of other accounts using at least the second vertical categorization; and
   generating the vertical cluster comprising the online account and the plurality of other accounts based on the identifying.

4. The machine learning system of claim 3, wherein the vertical cluster is generated based on clustering account transaction data for the online account and the plurality of other accounts using k-means clustering.

5. The machine learning system of claim 1, wherein the operations further comprise:
   determining a location rank for the first vertical categorization at the first location based on a plurality of transactions by the online account and a plurality of other accounts, wherein the vertical propensity is further determined based on the location rank.

6. The machine learning system of claim 1, wherein the operations further comprise:
   determining that the transaction requires additional authentication to process the transaction with the online account based on the risk assessment; and
   outputting an authentication request interface on a device associated with the processing request based on the additional authentication.

7. The machine learning system of claim 6, wherein the operations further comprise:
   in response to authenticating the device through the additional authentication, processing the transaction using the online account; and
   updating the vertical propensity based on the processing the transaction.

8. The machine learning system of claim 1, wherein the first location comprises a first country where the entity sells items within the first vertical categorization, wherein the second location comprises a second country of use of the online account, and wherein the transaction comprises a cross-border transaction with the entity using the online account.

9. The machine learning system of claim 1, wherein the operations further comprise:
   determining that the transaction is fraudulent based on the risk assessment; and
   locking the online account from use based on the determining that the transaction is fraudulent.

10. The machine learning system of claim 1, wherein the operations further comprise:
    determining an account value level for the online account, wherein the risk assessment is further based on the account value level.

11. The machine learning system of claim 1, wherein the operations further comprise:
    in response to performing the risk assessment, processing the transaction in accordance with the risk assessment; and
    outputting a transaction processing result to a device associated with the processing request.

12. A method comprising:
    in response to receiving, from an online account, a processing request for a transaction with an entity located at a first location, determining a first vertical categorization for the transaction;
    determining a second location associated with the online account based on the processing request;
    identifying a vertical cluster associated with the online account based on the first location and the second location, wherein the vertical cluster comprises a second vertical categorization having a previous transaction completed by the online account within the second vertical categorization;
    determining, using a machine learning engine, a vertical propensity for the online account to request the transaction within the first vertical categorization based on the second vertical categorization and one or more risk rules generated by a machine learning engine using past transactional data and an association rule mining process utilized by the machine learning engine; and
    generating, using the machine learning engine, a risk assessment of the transaction based on the vertical propensity.

13. The method of claim 12, wherein the vertical propensity comprises a probability associated with purchase transactions by the online account and a plurality of other accounts associated with the second location for purchase of items within the first vertical categorization from entities at the first location.

14. The method of claim 13, wherein prior to identifying the vertical cluster, the method further comprises:
- identifying shared verticals for the online account and the plurality of other accounts using at least the second vertical categorization; and
- generating the vertical cluster comprising the online account and the plurality of other accounts based on the identifying.

15. The method of claim 14, wherein the vertical cluster is generated based on clustering account transaction data for the online account and the plurality of other accounts using k-means clustering.

16. The method of claim 12, further comprising:
- determining a location rank for the first vertical categorization at the first location based on a plurality of transactions by the online account and a plurality of other accounts, wherein the vertical propensity is further determined based on the location rank.

* * * * *